United States Patent [19]
Ledwig

[11] Patent Number: 5,454,431
[45] Date of Patent: Oct. 3, 1995

[54] POLY-PIPE HANDLING IMPLEMENT

[76] Inventor: Dewayne Ledwig, P.O. Box 333, Tillar, Ark. 72670

[21] Appl. No.: 110,110

[22] Filed: Aug. 23, 1993

[51] Int. Cl.$^6$ ...................................................... F16L 1/00
[52] U.S. Cl. .............................................. 171/43; 405/154
[58] Field of Search ..................................... 405/174, 176, 405/177, 180, 184, 154; 171/43; 111/199; 47/56

[56] References Cited

U.S. PATENT DOCUMENTS

| | | | |
|---|---|---|---|
| 1,787,902 | 1/1931 | Herfort | 47/9 |
| 2,078,872 | 4/1937 | Pfeiffer | 47/9 |
| 3,065,605 | 11/1962 | Zitko | 111/199 |
| 3,468,267 | 9/1969 | Morris et al. | 111/73 |
| 3,559,414 | 2/1971 | Pike et al. | 405/181 |
| 4,071,203 | 1/1978 | Sneed et al. | 242/86.6 |
| 4,092,936 | 6/1978 | Griffin et al. | 47/9 X |
| 4,114,391 | 9/1978 | Kahley, Sr. | 405/176 X |
| 4,243,345 | 1/1981 | Cha et al. | 405/166 X |
| 4,266,724 | 5/1981 | DiPalma et al. | 239/195 |
| 4,379,655 | 4/1983 | Brost et al. | 405/176 |
| 4,461,598 | 7/1984 | Flechs | 405/174 X |
| 4,637,755 | 1/1987 | Tollefson et al. | 405/174 X |
| 4,744,696 | 5/1988 | Vidler | 405/177 X |
| 5,190,409 | 3/1993 | Hall | 405/154 |
| 5,297,898 | 3/1994 | Wuertz | 405/154 |
| 5,366,023 | 11/1994 | Souza | 405/180 X |

Primary Examiner—Randolph A. Reese
Assistant Examiner—Christopher J. Novosad
Attorney, Agent, or Firm—Stephen D. Carver; Trent C. Keisling

[57] ABSTRACT

An implement for handling flexible or collapsible multi ply polyethylene tubing comprising a rigid frame adapted to be secured to a tow vehicle, a powered spool rotatably secured to the frame to receive poly-pipe and an interchangeable retrieval subframe and plow. The frame has a front cross piece, a rigid side rail and a swinging side rail. The spool is mounted between the distal ends of the side rails. A mount on the front cross piece receives the retrieval subframe or plow. The subframe flattens and shapes the poly-pipe for spooling. The subframe comprises a base with arms extending from it. Tension bars extend from one arm to the other. Also, a pair of crossed diagonal cleaning members extend between the arms. The poly-pipe is drawn over the bars and between the cleaning members to flatten and clean the poly-pipe for convenient winding about the spool. The swinging frame rail is swung out to remove or place poly-pipe on the spool. A pillar extends from the base of the subframe to mate with the mount on the front cross piece. A similar pillar extends upward from the plow. To place poly-pipe the plow is used to cut a shallow furrow into which the poly-pipe is laid.

20 Claims, 5 Drawing Sheets

POLY-PIPE HANDLING IMPLEMENT

BACKGROUND OF THE INVENTION

I. Field of the Invention

The present invention broadly relates to irrigation system equipment. Specifically the present invention is an implement to handle flexible or collapsible tubing such as two ply, flexible, polyethylene tubing. Art pertinent to the present invention is classified in U.S. Patent Class 45, subclass 176.

II. The Prior Art

Conventional irrigation systems are expensive to build and permanent in nature. Such systems include aqueducts or pipelines leading to a field. Dispersion systems are needed once the water is transported to the field. Some years these systems sit idle since they are not needed. At other times water can not reach the areas where it is needed. Furthermore, due to crop rotation certain fields set idle on alternate years. Therefore, the irrigation system serving that field is not used for those idle years. As a result, the use of convertible or temporary irrigation systems has become prevalent. Additionally, convertible and temporary systems may be used when an emergency situation arises, such as an unusual drought. One such temporary system employs flexible or collapsible tubing. Typically this tubing is a multi-ply polyethylene tubing which, when not in use, assumes a relatively flat cross section. In other words, it will completely collapse making it convenient to dispose on rolls, facilitating handling. The common name for this type of pipe or tubing is "poly-pipe."

Use of poly-pipe has increased in resent years. It is particularly attractive due to its versatility and adaptive nature. Furthermore, it is relatively inexpensive compared to complicated structures such as rigid pipelines or aqueducts. Using poly-pipe a particular area in a field can very easily be irrigated with a minimum of disturbance.

The conventional method of deploying poly-pipe involves the use of a tractor with a plow to cut a three to five inch deep furrow to receive and stabilize the poly-pipe. The pipe is unrolled out of the bed of a pickup or is similarly placed. Dirt can be piled on the tubing at intervals to help hold it in the furrow if windy conditions are present. The end of the tubing to be connected to a water source, such as a field pump, is doubled back for ten to twenty feet for reinforcement. That end is attached to the pump with duct tape or the like. As water flows through the pipe, holes may be punched along its length to irrigate specific areas. Generally speaking the end of the tube is not blocked but is left open to prevent damage to the tube or loosening of the connection to the water source.

The prior art discloses numerous devices related to laying plastic, paper, tape and other relatively flat material on the surface of the ground or underground. Various types of tapes are used in agriculture including tapes containing seeds for planting. There are numerous devices to trench and lay seed tape. Some provide a compaction roller. Among these are U.S. Pat. No. 4,114,391, issued to Kahley, Sep. 19, 1978; Zitko, U.S. Pat. No. 3,065,605; Morris, U.S. Pat. No. 3,468,267; and Griffin, U.S. Pat. No. 4,092,936.

Other patents disclose apparatuses to lay various types of film or paper for use in agriculture. Borst, U.S. Pat. No. 4,379,655, discloses a process and apparatus for laying subterranean film. This device uses a plow and has a spool deployed on it.

Pfeiffer, U.S. Pat. No. 2,078,872, discloses a machine for laying protective paper over plants. This device employs a spool to handle the paper and a framework to shape the paper as it is laid. Herfort, U.S. Pat. No. 1,787,902, discloses a mechanism for laying mulching paper. It employs a roller and small discs to disc dirt over the edges of the paper to hold it in place.

As mentioned above, the use of poly-pipe has become quite popular in recent years. The material comprising this tubing is not biodegradable. If it were biodegradable it would not be of much use in a farm field over an extended period of time. Exposure to sunlight, soil and water would cause it to breakdown.

Currently the United State Environmental Protection Agency is requiring that farmers cease disposing of poly-pipe in landfills. The poly-pipe is recyclable into a similar material and may be reused in some cases. In order to be reused the poly-pipe must not be torn or ripped. It is difficult to handle tubing once it has been placed. Conventional retrieval techniques involve gathering the poly-pipe up into the back of a pick-up truck or the like. Poly-pipe thus collected is bulky and difficult to hold in place. As the truck drives down the highway the pipe will very likely be caught by the wind and pulled out of the bed. Furthermore, leaving it in place in the farm field is not practical as it will interfere with operation of machinery and will be destroyed by those operations. As a result, it is necessary to have an implement to make retrieval of the poly-pipe convenient. To make handling or recycling of the poly-pipe practical it needs to be relatively clean and wound into a roll.

Various types of spooling devices are well known in a variety of arts. The use of spools on farming equipment is illustrated in DiPalma, U.S. Pat. No. 4,266,724. This device is a mobile spraying apparatus with a pipe carrying drum. This device also employs a series of rollers to assist in handling the pipe. Pike, U.S. Pat. No. 3,559,414, is a tractor mounted device for laying flexible cable. This device employs a trenching apparatus and various pulleys are used to guide the flexible cable into place. Sneed, U.S. Pat. No. 4,071,203, discloses a method and device for laying flexible plastic pipe. This system is similar to those used in laying flexible natural gas lines. Cha, U.S. Pat. No. 4,243,345 discloses a pipe handling apparatus for a reel pipe laying system. It uses various guideways to steer a pipe as it is being deployed.

Therefore, it is desirous to provide a piece of equipment or an implement which can handle flexible polyethylene tubing or the like. This implement would need to be able to deploy the poly-pipe by digging a shallow trench and spool the material off into the trench. Additionally, and more importantly, the implement would need to be able to pick up the poly-pipe and clean it to a degree sufficient for reuse or recycling. In order to carry out this latter task the implement would need to clear water from within the pipe and wipe or brush dirt from the exterior of the pipe. To accomplish this task the pipe could be passed back and forth over tension bars to squeeze it and be passed through cleaners such as squeegees or brushes to remove dirt from the exterior.

SUMMARY OF THE INVENTION

My Poly-pipe Handling Implement makes retrieval of poly-pipe vastly more convenient. Furthermore it makes reuse or recycling of poly-pipe practical by cleaning, draining and winding the poly-pipe into a roll. The Implement passes the pipe back and forth over tension bars to squeeze water form inside the pipe and to flatten it. The pipe also passes through at least one pair of cooperating squeegees or brushes to remove dirt from the exterior. Additionally, my implement can be refitted to lay poly-pipe. It will dig a shallow trench and spool the material off into the trench.

My implement comprises a rigid frame mounting a motor driven spool and an interchangeable retrieval subframe or plow. The implement can be mounted to a conventional farming tractor with a three point hitch system. With slight modifications the implement can be mounted on a tool bar or on the rear of a truck equipped with a hydraulic pump.

The frame comprises a front cross piece with rearwardly extending side rails and a mount to receive the retrieval subframe or plow. The front cross piece is rectangular and has forwardly extending tongues adapted to mate with a tractor's three point hitch. One side rail is rigid. The other swings clear to allow removal or installation of spooled poly-pipe. The motor for the spool is mounted on the distal end of the rigid frame rail. It is driven by hydraulic pressure provided by the tractor. The spool is mounted in bearings disposed on the distal end of each side rail. The swinging side rail is hinged to the front cross piece. It is locked in place by a removable pin. Jacks extend from the frame rails to support the implement during installation and removal.

The spool comprises a spindle extending from the rigid frame rail, and an idler axle associated with the swinging rail. A rim is secured to the spindle and a second rim is secured to the axle. A boss in the inboard end of the axle mates with the end of the spindle. When the swinging frame rail is swung out the idler axle with the second rim swings clear. This provides access to the spindle for mounting and removing poly-pipe or a cardboard tube to receive poly-pipe. A notch is cut in the tube and indexes with a tab disposed on the spindle. A collar fits over the notch and tab to reinforce the notch.

The retrieval subframe comprises a base with a pair of arms extending rearwardly and upwardly. The tension bars extend between the arms. A pillar extends upwardly from the base to be received by the mount on the front cross piece. A pair of guides are disposed on the ends of the base to prevent the poly-pipe from slipping to the side during retrieval. The tension bars are preferably round pieces of bar stock. The poly-pipe is alternately passed over and under the bars to squeeze water out of it and to flatten it for spooling. The cleaners diagonally span the subframe. Squeegee cleaners are used when the soil on the pipe is a thick or wet. Dryer, duster soil can be removed by brushes.

The plow can be secured to the frame in place of the retrieval subframe. It too has a pillar extending upwardly to mate with the mount on the front cross piece. The plow is a "V" shaped blade with a reinforcing cross member to which the pillar is secured. The retrieval subframe and plow are interchanged by pulling a pin passing through the mount and the pillar.

To retrieve poly-pipe the tractor mounting the implement, with the retrieval subframe in place, is positioned astride a section of poly-pipe. The bitter end of the poly-pipe is fed between the guides, over the first tension bar, between the cleaning members, under the rear tension bar and then secured to the spool. Hydraulic pressure from the tractor is provided to the hydraulic motor to begin winding poly-pipe unto the spool. The tractor is moved forward matching its speed to the speed of the spool. To remove ploy-pipe, the tractor is stopped, the pin securing the swinging frame rail is pull and the rail is swung out.

To place poly-pipe the subframe is replaced with the plow. A roll of poly-pipe is placed on the spindle. The three point hitch is lowed until the plow is cutting a three to five inch deep furrow. The motor is disengaged and, the poly-pipe is fed off the back of the implement into the furrow.

Therefore, a primary object of the present invention is to provide an implement to handle flexible or collapsible multi-ply polyethylene tubing.

A related object of the present invention is to provide an implement which facilitates placement of poly-pipe.

A further related object of the present invention is to provide an implement which will facilitate retrieval of poly-pipe.

An object of the present invention is to provide an implement which will press water and air out of poly-pipe during retrieval.

Another object of the present invention is to provide an implement which will clean the exterior of the poly-pipe during retrieval.

An object of the present invention is to provide a device which will allow the retrieval of poly-pipe for reuse.

Additionally, an object of the present invention is to provide an implement which will allow the retrieval of poly-pipe for recycling.

An object of the present invention is to provide an implement which will aid in the retrieval of ploy-pipe to prevent is contamination of a farm field.

An object of the present invention is to provide an implement consistent with the above objects which can be deployed on a conventional three point tractor hitch.

An object of the present invention is to provide an implement for handling poly-pipe which can be deployed on a conventional tool bar.

An object of the present invention is to provide a single poly-pipe handling implement which is convertible between placement and retrieval modes.

An object of the present invention is to provide a poly-pipe handling system which is convenient and practical to use.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE DRAWINGS

With reference now to the accompanying drawings my poly-pipe handling implement is broadly designated by the reference numeral 20. This implement 20 comprises a rigid frame 25 preferably adapted to hitch to a three point hitch system 30 of conventional farm tractor 35. A motor driven spool 40 is secured to the distal portion 42 of the frame 25. If the implement 20 is set up to pick up poly-pipe 45, a poly-pipe retrieval subframe 50 is disposed inside the frame 25. The subframe 50 is spanned by spaced apart rigid tension bars 55. Poly-pipe 45 is passed over and under the tension bars 55 to compress the poly-pipe 45 pushing water and air out and shape it for winding onto the spool 40. The poly-pipe 45 also passes through a pair of diagonally opposed cleaners 60, 62. The cleaners 60, 62 can be squeegees and/or brushes depending on the type of soil on the exterior of the poly-pipe 45. Alternatively a plow 70 can be disposed in place of the retrieval subframe 50. The plow 70 is used to cut a shallow furrow when poly-pipe 45 is to be deployed by the implement 20.

The frame 25 comprises a generally rectangular front cross piece 75 with rearwardly extending side rails 77, 80. The spool 40 is captivated between the side rails 77, 80. The front cross piece 75 comprises two generally vertical columns 81, 82 and two horizontal beams 83, 84. A mount 85 extends between the beams 83, 84, welded to the rear face of the beams 83, 84. The lower end of the mount 85A receives a pillar 88 extending from a base of the subframe 50 or a pillar 90 extending from the plow. The front cross piece 75 has tongues 91, 93 and 95 adapted to mate with the three point hitch 30 of the aforementioned conventional tractor 35. One side rail 77 is rigidly fixed in place to the front cross piece 75. A motor bracket 98 is disposed on the outboard side of the distal end of the rigid side rail 77. The motor 100 which drives the spool 40 is secured to this motor bracket 98. Preferably the motor 100 is a hydraulic motor 100 driven by hydraulic pressure provided by the tractor 35. It is held in place by bolts 101. The motor 100 is coupled to the spool 40 by a flexible joint 105. Generally speaking, modern farm tractors 35 output hydraulic pressure which can be controlled by the tractor operator. Therefore, the speed of the spool 40 can be controlled by the operator of the tractor 35. A pair of bearing housings 107, 108 are disposed in the distal end of the rigid frame rail 77. The spindle 110 of the spool is supported by these bearings 107, 108.

Figure 9:
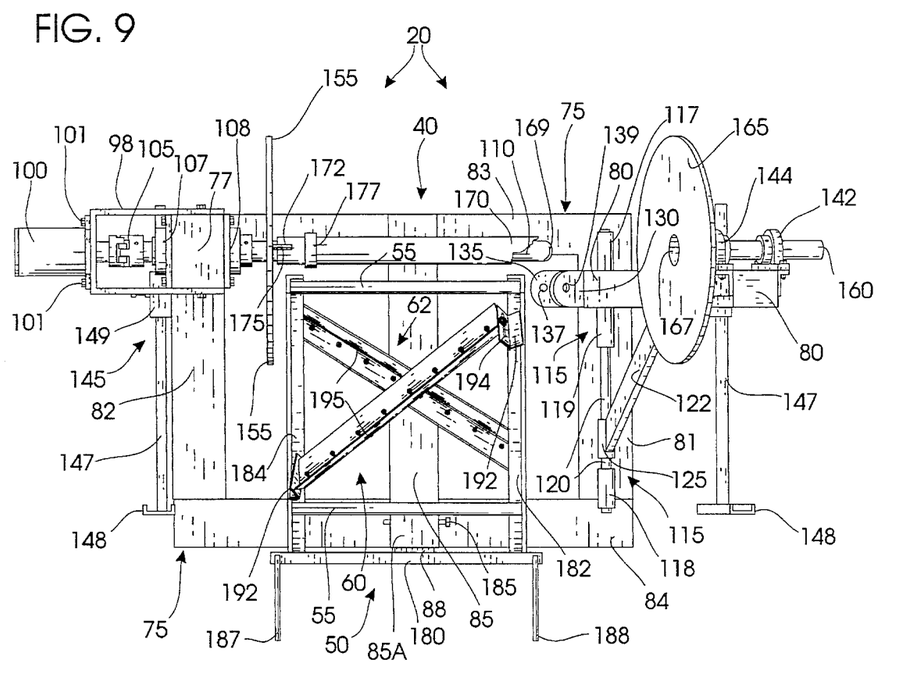
FIG. 9 is a rear, partially fragmented elevational view of the implement with the retrieval subframe in place and the swinging side rail partially swung to the side.
Figure 10:
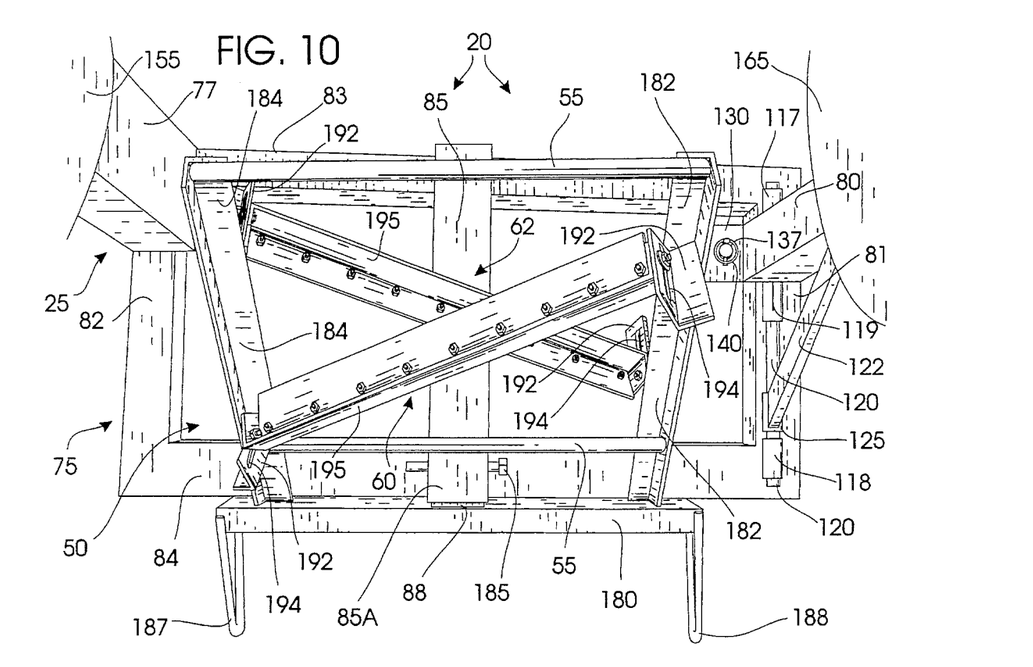
FIG. 10 is a partially fragmented rear perspective view of the implement.
Figure 11:
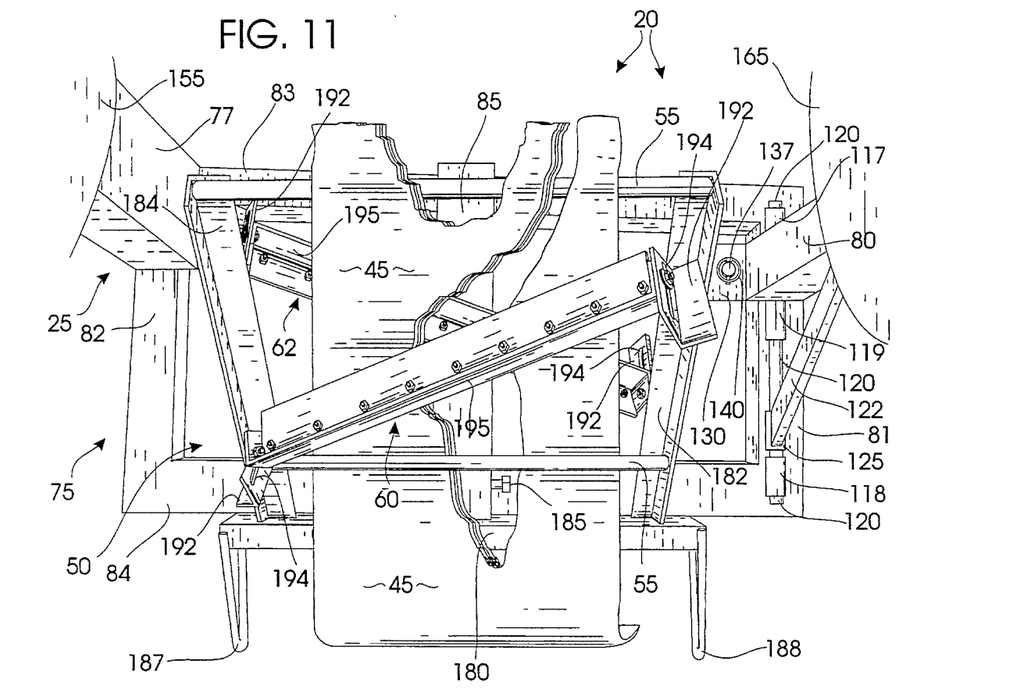
FIG. 11 is a partially fragmented rear perspective view of the implement with a section of poly-pipe threaded through the retrieval subframe.

The opposite frame side rail 80 is swingable. It is secured to the front cross piece 75 by a vertical hinge 115. Hinge bosses 117, 118 and 119 are secured at several points on the front cross piece 75 to receive a hinge pin 120. A first boss 117 is secured to the upper portion of the right cross piece column 81 and the end of the top beam 83. A lower boss 118 is secured to the lower portion of the right column 81 and the end of the lower beam 84. A central boss 119 is secured to a central portion of the column 81. A boss defined in the forward end of the frame rail 80 receives the pin 120. The frame member boss is captivated between the top and central bosses 117, 119. A strut 122 extends from a mid portion of the swinging frame rail 80 to a final boss 125 hinged at the pin 120. A striker plate 130 extends inboard from the front end of the swingable frame rail 80 (FIG. 9). A receiver plate 135 extends inboard from the right front cross piece column 81 to mate with the striker plate 130. A stud 137 extends from the receiver trough an orifice 139 in the striker plate 130. A vertical orifice through the portion of the stud protruding beyond the striker plate 130 receives a locking pin 140. When the locking pin 140 is removed the swinging frame rail 80 can be pivoted about the hinge pin 120 to allow removal of poly-pipe 45 from the spool 40. The distal end of the swingable frame rail 80 mounts an aligned pair of bearings 142, 144 to receive a portion of the spool 40.

Extensible jacks 145 extend from the frame rails 77, 80 for supporting the rear portion of the implement 20. Such support is necessary during installation, removal and storage. The jacks 145 comprise tubular legs 147 terminating in a ground contacting foot 148. The legs 147 are received within sleeves 149 secured to the frame rails 77, 80. The legs 147 are clamped in place by bolts 150 threaded through orifices in the sleeves 149.

The spool 40 comprises a spindle 110 extending from the flexible joint 105 through the bearings 108, 107 secured to the rigid side rail 77. A rim 155 is secured to the spindle 110 near the rigid frame rail 77. The spindle 110 spans most of the distance between the frame rails 77, 80. An idler axle 160 passes through the bearings on the end of the swingable frame rail 80. A second rim 165 is secured to the inboard end of the axle 160. A socket 167 is defined in the inboard end of the idler axle 160 to receive the end 169 of the spindle 110. When the swingable frame rail 80 is swung away from the spindle 110, the second rim 165 and idler axle 160 swing clear to allow installation or removal of a poly-pipe tube 170. An indexing tab 172 extends from the spindle 110 adjacent the first rim 155. A matching notch 175 is cut in the cardboard poly-pipe tube 170. A reinforcing collar 177 is disposed over the notch 175 and tab 172 to reinforce the notch 175 and prevent it from tearing out.

Figures 12, 13:
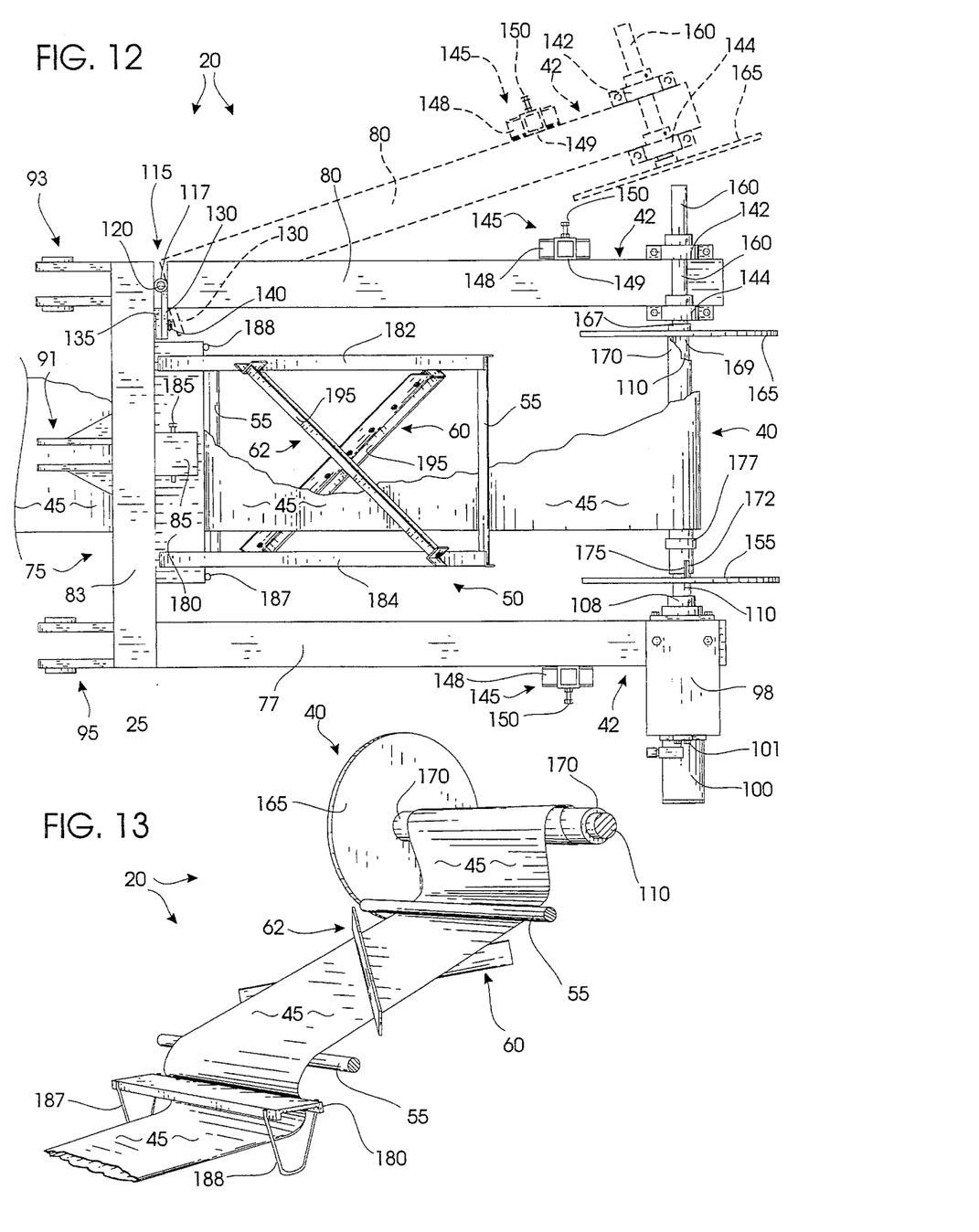
FIG. 12 is a partially fragmented top plan view of the implement illustrating the threading path of the poly-pipe, with the moved position of the swingable side rail illustrated in dashed lines.
FIG. 13 is a diagrammatical representation of the path of poly-pipe through the retrieval subframe onto the spool.

The subframe 50 used for retrieval of poly-pipe 45 in the present implement 20 is removably disposed within the area defined by the front cross piece 75, the side rails 77, 80 and the spool 40. It comprises a base 180, a pair of support arms 182, 184 extending rearwardly and upwardly from the base 180 and plurality of tension bars 55 spanning the distance between the support arms 182, 184. The mounting pillar 88 extends upward from the base 180. It is secured in place in the mount 85 by a pin or bolt 185. The bolt passes through aligned pairs of orifices defined in the mount 85 and the pillar 88. A pair of guides 187, 188 extend downward from the outside edges of the base 180 to help guide the poly-pipe 45 and prevent it from slipping from side to side during retrieval. The poly-pipe 45 is alternately passed over and under the tension bars 55 in order to squeeze and flatten it (FIG. 13). The tension bars 55 are preferably round to facilitate passage of the poly-pipe 45. As the poly-pipe 45 is picked up and squeezed, water is pushed forward through the pipe and the flatten pipe can be easily rolled onto the tube 170 disposed on the spool 40. Cleaning members 60, 62 extend across the subframe 50 from arm to arm. Brackets extending 192 from the arms receive the casing 195 of the squeegees or brushes used as cleaners 60, 62. The cleaners 60, 62 can be adjusted by moving the casing along the slots 194 disposed in the brackets 192. Squeegees are used when a thicker, wetter soil is disposed on the exterior surface of the poly-pipe 45. If dryer, duster soil is on the poly-pipe 45 then brushes can be used to remove it.

Figure 5:
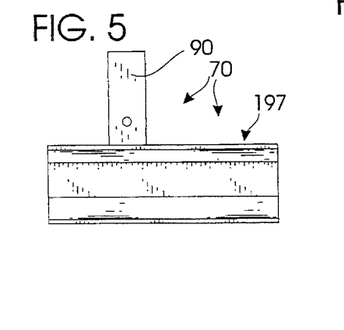
FIG. 5 is a left side elevational view of the poly-pipe placement plow.
Figure 6:
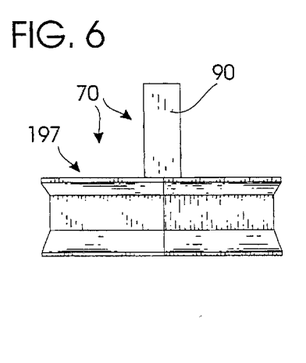
FIG. 6 is a front elevational view if the plow.
Figure 7:
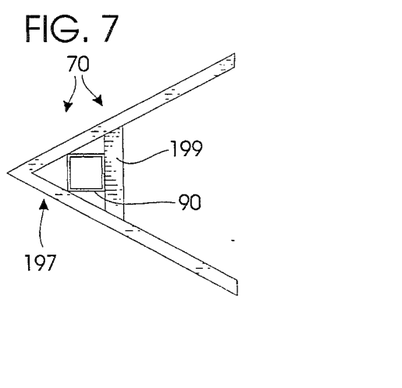
FIG. 7 is a top plan view of the plow.
Figure 8:
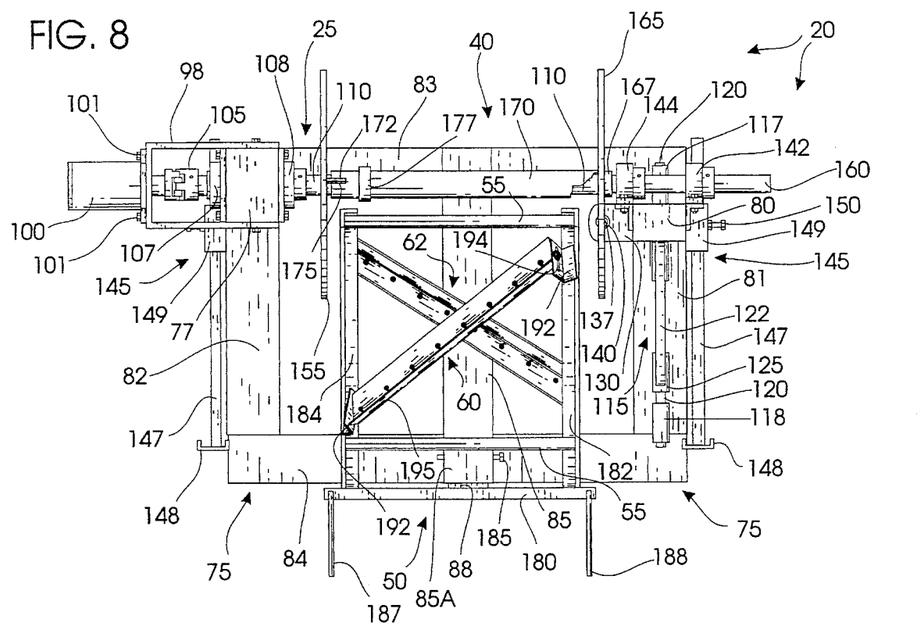
FIG. 8 is a rear, partially fragmented elevational view of the implement with the retrieval subframe in place.

The plow 70 is intended to be disposed in place of the subframe 50 during poly-pipe 45 laying. It is also secured in place by a pillar 90 extending upward from the plow 70 into the mount 85 disposed on the front cross piece 75. It is pinned in place similar to the subframe 50. As illustrated in FIGS. 5 through 7, the plow 70 comprises a "V" shaped blade 197, a reinforcing cross member 199 and the aforementioned upwardly extending pillar 90.

Operations

Currently the United State Environmental Protection Agency is requiring that farmers cease disposing of poly-pipe 45 in landfills. Therefore, recycling or reuse are the only logical alternatives. In order to be reused the poly-pipe 45 must not be torn or ripped. As a result, it is necessary to have an implement to make retrieval of the poly-pipe convenient. Additionally, it is desirable that as the pipe is picked up that it be cleaned as best as possible to facilitate recycling or handling.

To handle poly-pipe 45 the implement 20 is mounted to the rear of a conventional farming tractor 35 with a three point hitch system 30. Alternatively the implement 20 can be secured to a tool bar using "U" bolts. With slight modifications the implement 20 could be used in the bed of a pick up truck or on a flat bed truck equipped with a "wet kit" to supply hydraulic pressure. Once the frame 25 is in place on a tractor 35, the subframe 50 or plow 70 is secured in place. If the subframe 50 or the plow 70 is to be removed, the pin or bolt 185 is pulled from the mount 85 to release the pillar 88 or 90. The pillar 88 or 90 of the subframe 50 or plow 70 to be mounted is inserted into the mount 85 and pined in place.

Figure 1:
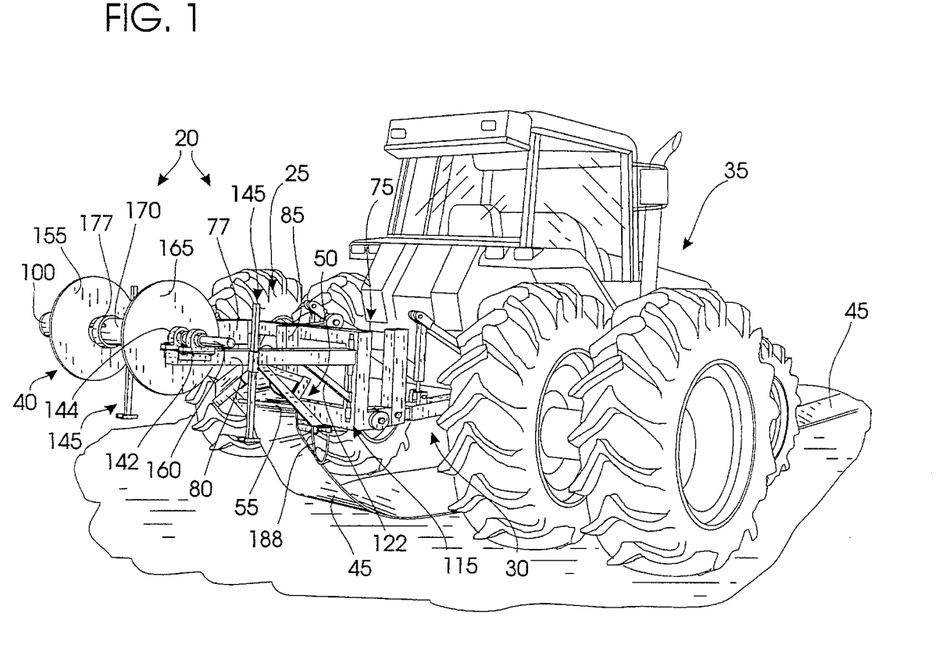
FIG. 1 is an environmental isometric view of a tractor with my Poly-pipe Handling Implement deployed on its three point hitch retrieving poly-pipe.
Figure 2:
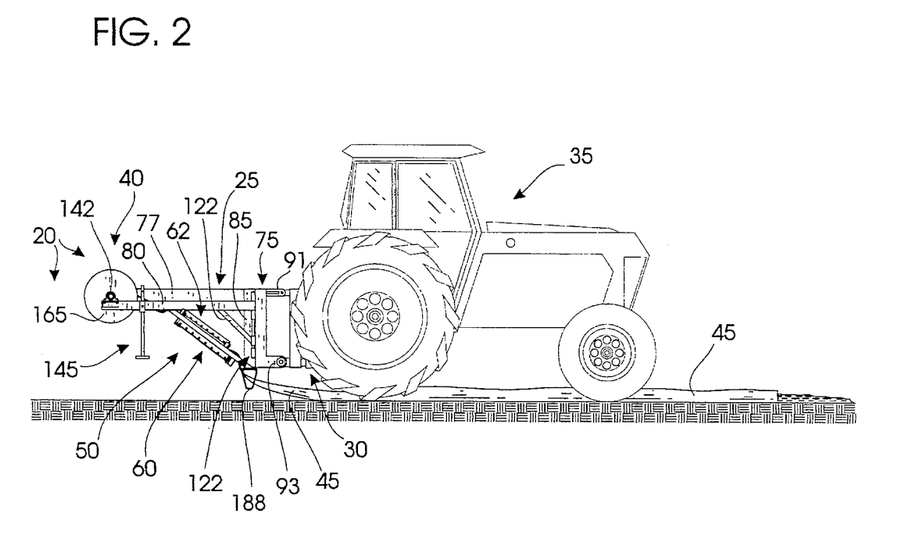
FIG. 2 is a side environmental view of a tractor employing my implement deployed to pick up poly-pipe.
Figure 3:
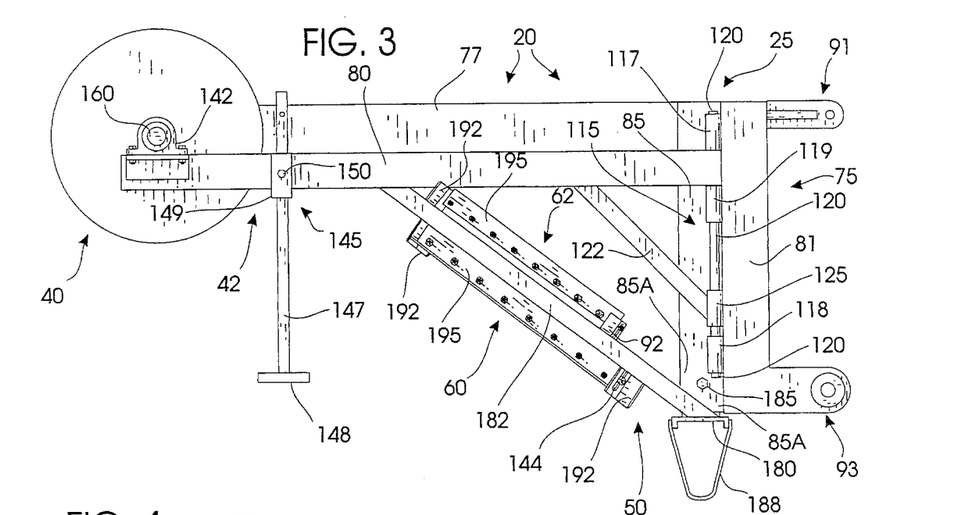
FIG. 3 is a right side elevational view of my implement with the retrieval subframe installed.
Figure 4:
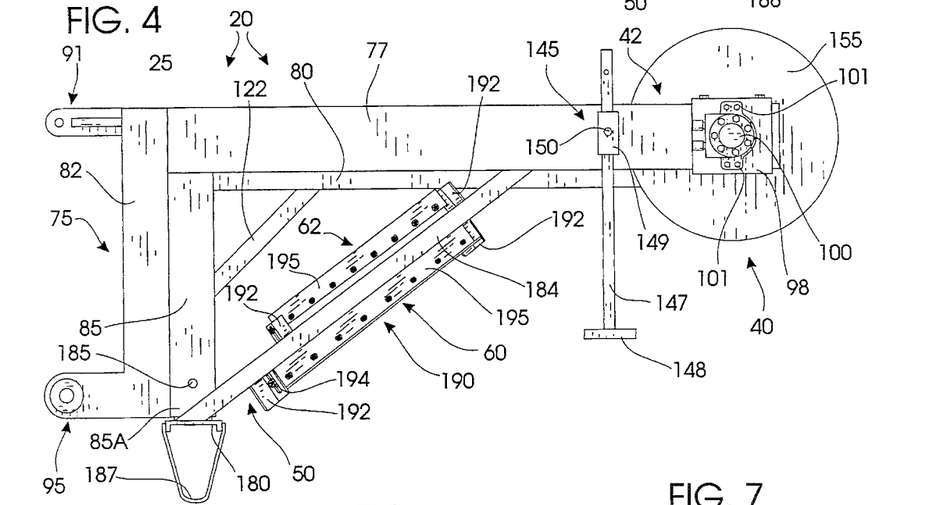
FIG. 4 is a left side elevational view of my implement with the retrieval subframe installed.

If the implement is to retrieve poly-pipe, the tractor 35 is positioned astride a section of poly-pipe 45 (FIG. 1). The tail of the poly-pipe is fed between the guides 187, 188 over the first tension bar 55, between the cleaning members 60, 62 and under the rear tension bar 55. The tail of the poly-pipe 45 is then wrapped around the spool 40 and if necessary secured in place. Hydraulic pressure is provided to the hydraulic motor 100 to begin winding poly-pipe 45 onto the spool 40. When the tractor 35 is moved forward, the speed of the spool 40 and the speed of the tractor 35 are matched by regulating the hydraulic pressure supplied to the motor 100. Once the spool 40 is sufficiently filled or the end of the ploy-pipe is reached, the tractor 35 is stopped and the swinging frame rail 80 is swung out. This is accomplished by pulling the pin 140 securing the swingable side rail 80 in place and swinging the rail 80 outward. As illustrated in FIGS. 9 and 12 the roll of poly-pipe 45 is now exposed and the rim 165 of the spool is clear so the roll 170 can be pulled off the spindle 110.

In order to place poly-pipe 45 the subframe 50 is replaced with the plow 70 and locked in place by the pin. The swingable frame rail 80 is swung out and a roll of poly-pipe 45 is placed on the spindle 110. The swinging side rail 80 is swung back into position and locked. The implement 20 is lowered until the plow 70 contacts the ground and begins to cut a shallow furrow, three to five inches deep. The motor 100 is disengaged and, the poly-pipe 45 is fed off the back of the implement 20 into the furrow.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A poly-pipe handling implement comprising:

a rigid frame adapted to be secured to a tow vehicle;

a powered spool rotatably secured to said frame to receive poly-pipe;

shaping means for preparing recovered poly-pipe for winding upon said spool by pressing water and air from the poly-pipe interior, said shaping means comprising:

a pair of rigid, spaced apart tension bars extending across said shaping means;

a pair of crossed diagonal cleaning members for removing soil and the like from recovered poly-pipe;

wherein said poly-pipe is drawn over said bars and between said cleaning members to flatten the poly-pipe for convenient winding about said spool.

2. The implement as defined in claim 1 wherein said shaping means comprises:

a rigid base adapted to be secured to said frame; and, a pair of rigid, spaced apart support arms extending from said base rearwardly toward said spool between which said bars and said cleaning members extend.

3. The implement defined in claim 2 wherein said frame comprises:

a front cross piece adapted to be secured to conventional three point hitch; and, a pair of rigid parallel side rails extending rearwardly from said front hitch for supporting said spool.

4. The implement as defined in claim 3 wherein one of said frame side rails is swingably mounted to expose said spool, thereby allowing removal of collected poly-pipe.

5. The implement as defined in claim 2 wherein said frame comprises a mount for receiving and mounting said shaping means.

6. The implement defined in claim 2 further comprising guide means on said base for preventing lateral displacement of said poly-pipe.

7. The implement defined in claim 1 wherein said cleaning members are squeegees.

8. The implement defined in claim 1 wherein said cleaning members are brushes.

9. The implement defined in claim 1 wherein said frame further comprises a plurality of stands retractably extending downwardly for selectively supporting said implement.

10. The implement defined in claim 1 wherein said spool further comprises a tab to index with a notch defined in a poly-pipe tube.

11. The implement defined in claim 10 further comprising a slidable collar for selectively covering said tab and notch to reinforce said tube.

12. An implement for handling poly-pipe that is disposable in a poly-pipe retrieval mode, said implement comprising:

a rigid frame adapted to be secured to a tow vehicle;

a powered spool rotatably secured to said frame for selectively receiving poly-pipe; and, a shaping subframe removably coupled to said frame during poly-pipe retrieval for preparing recovered poly-pipe for winding upon said spool by pressing water and air from the poly-pipe interior, said shaping subframe comprising:

tension means for removing said water;

cleaning means for removing soil and the like from recovered poly-pipe;

a rigid base adapted to be secured to said frame; and, a pair of rigid, spaced apart support arms extending from said base toward said spool, said arms supporting said tension means and said cleaning means.

13. The implement defined in claim 12 wherein said frame comprises:

a front cross piece adapted to be secured to conventional three point hitch; and, a pair of rigid, parallel side rails extending rearwardly from said front hitch for supporting said spool.

14. The implement as defined in claim 13 wherein one of said frame side rails is swingably mounted to expose said spool, thereby allowing removal of collected poly-pipe.

15. The implement as defined in claim 14 wherein said frame comprises a mount for selectively receiving and mounting said shaping subframe.

16. The implement defined in claim 12 wherein said cleaning means comprises squeegees.

17. The implement defined in claim 12 wherein said cleaning means comprises brushes.

18. The implement defined in claim 12 wherein said spool further comprises a tab to index with a notch defined in a poly-pipe tube.

19. The implement defined in claim 18 further comprising a slidable collar for selectively covering said tab and notch to reinforce said tube.

20. An implement for handling poly-pipe that is primarily, selectively disposed in a poly-pipe retrieval mode, said implement comprising:

a frame adapted to be secured to a tow vehicle;

spool means rotatably secured to said frame for selectively reeling poly-pipe;

shaping means for preparing recovered poly-pipe for winding upon said spool means, said shaping means comprising:

means for removing water and air from the poly-pipe interior; and, cleaning means for removing soil and the like from recovered poly-pipe; and, wherein said poly-pipe is tensioned and cleaned prior to winding about said spool.

* * * * *